No. 885,636. PATENTED APR. 21, 1908.
J. W. McKAY & C. E. WAUGH,
HEATING DEVICE FOR DINNER PAILS.
APPLICATION FILED DEC. 8, 1906.

Witnesses
Frank B. Hoffman.

Inventors
James W. McKay and
Charles E. Waugh
By Victor J. Evans.
Attorney

UNITED STATES PATENT OFFICE.

JAMES W. McKAY AND CHARLES EDWIN WAUGH, OF TATAMAGOUCHE, NOVA SCOTIA, CANADA.

HEATING DEVICE FOR DINNER-PAILS.

No. 885,636.          Specification of Letters Patent.          Patented April 21, 1908.

Application filed December 8, 1906. Serial No. 346,967.

*To all whom it may concern:*

Be it known that we, JAMES W. McKAY and CHARLES EDWIN WAUGH, subjects of the King of Great Britain, residing at Tatamagouche, in the Province of Nova Scotia and Dominion of Canada, have invented new and useful Improvements in Heating Devices for Dinner-Pails, of which the following is a specification.

This invention relates to heating devices for dinner pails, and one of the principal objects of the device is to provide means whereby the contents of the dinner pail may be quickly heated and to provide means whereby the heating device and the dinner pail may be connected together and detached when required.

Another object of our invention is to provide means whereby the draft to support the flame of the heating device may be regulated.

These and other objects are attained by means of the construction illustrated in the accompanying drawing, in which:—

Figure 1:
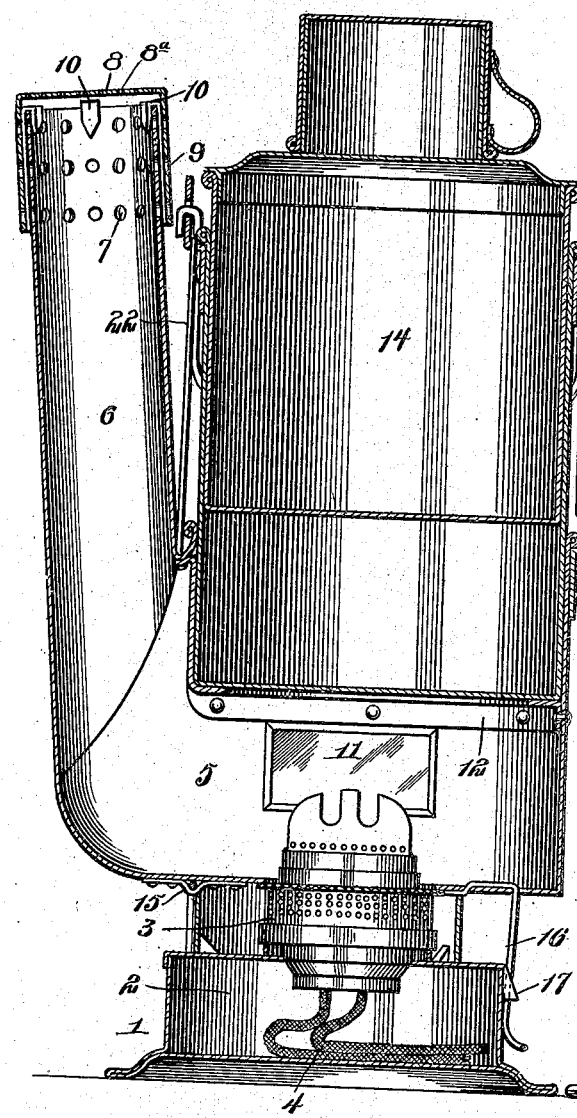
Figure 2:
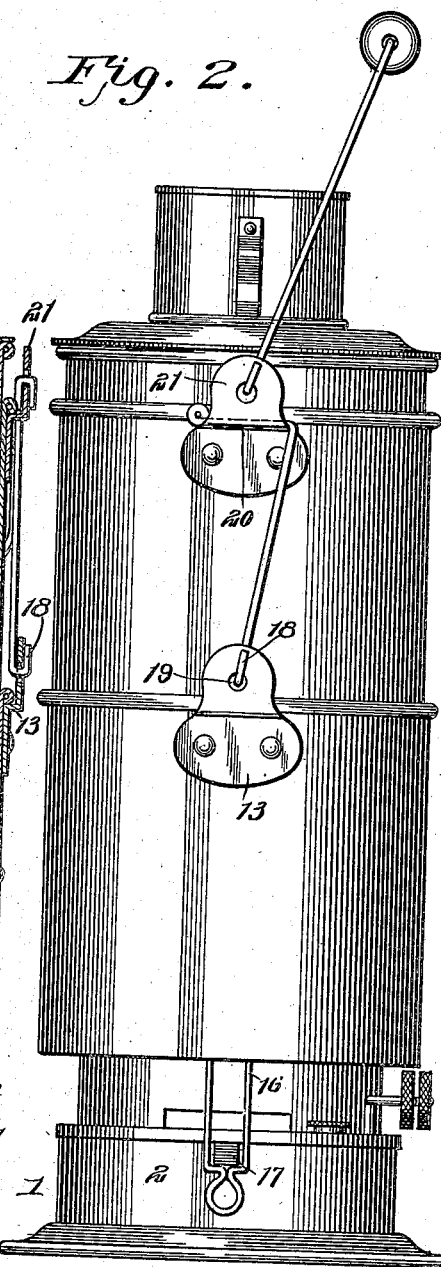

Figure 1 is a vertical sectional view of a dinner pail and heating device therefor made in accordance with our invention. Fig. 2 is a side elevation of the same.

Referring to the accompanying drawing for a more particular description of our invention, the numeral 1 designates a heating device for a dinner pail comprising an oil reservoir 2 and a burner 3 secured in the upper end of said reservoir, said burner being provided with wicks 4 and designed to burn kerosene oil. The upper end of the burner 3 projects into a heating chamber 5, said chamber having a draft tube 6 extending upward therefrom and terminating at its upper end in an outlet provided with a series of perforations 7. Fitted to the outlet is a cap 8, said cap having a series of perforations 9 in the sides thereof, said perforations adapted to be brought into register with the perforations 7 in the tube 6. Secured to the cap 8 is a series of hooks 10, said hooks serving to engage the upper edge of the tube 6 to hold the cap in place said hooks also serving to permit said cap to be adjusted to regulate the draft of the heating device, as will be understood. In the side of the heating chamber 5 is a sight opening 11 comprising a pane of glass or other transparent material. A flange 12 is secured within the chamber 5 to provide a support for the dinner pail.

The body portion of the heating chamber extends above the flange 12, and an ear 13 is secured near the upper edge of the extended portion. A dinner pail 14 of usual, or any suitable construction, is adapted to rest upon the flange 12 within the extended portion of the heating chamber, the bottom of said dinner pail being disposed immediately above the burner 3. The heater is hinged, as at 15, to the lower end of the heating chamber 5, and a spring latch 16 at the opposite side of the heating chamber is adapted to swing over a lug 17 formed on the heater. Connected to the ear 13 is a wire keeper provided with a hook 18 designed to engage an opening 19 in the ear 13, and the upper end of said keeper having an angularly bent end 20 which engages the bail ear 21 of the dinner pail 14. A similar keeper 22 is provided for the opposite side of the device.

The operation of our invention may be briefly described as follows: The dinner pail 14 is connected by means of the keepers to the heating device and may be carried with the same. When it is desired to heat the contents of the dinner pail the burner is lighted and when sufficiently heated the keepers may be detached from the bail ears of the dinner pail, and the latter is removed and the burner extinguished. To regulate the draft of the burner the cap 8 is adjusted upon the tube 6 so that the perforations 7 and 9 will be out of register, thus permitting the air to flow out through the openings 8$^a$ in the top of the cap.

Having thus described the invention, what is claimed as new, is:—

A device of the character described comprising an oil reservoir with a burner, a heating apparatus mounted over the burner and having a central supporting flange to provide an extension which serves as a receptacle for the lower portion of a dinner pail to permit of the bottom thereof to rest on the flange, said pail being provided with ears, a draft tube arranged at one side of the heater and extending upwardly therefrom, means secured on the opposite sides of the heater having extensions pivoted thereto, provided with angularly bent upper ends which serve to contact with the ears of the dinner pail to hold the same and the heater together, substantially as specified.

In testimony whereof, we affix our signatures in presence of two witnesses.

JAMES W. McKAY.
CHARLES EDWIN WAUGH.

Witnesses:
J. L. RALSTON,
JANET M. ESTABROOKS.